US010167076B1

United States Patent
Leuck et al.

(10) Patent No.: US 10,167,076 B1
(45) Date of Patent: Jan. 1, 2019

(54) CORRUGATED LIFT FAN ROTOR

(71) Applicant: Kitty Hawk Corporation, Mountain View, CA (US)

(72) Inventors: Cody Patrick Leuck, Saratoga, CA (US); Bernard F. Ahyow, Sunnyvale, CA (US); Zachary Lovering, Sunnyvale, CA (US); Ian Fernandez, Boulder Creek, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/838,784

(22) Filed: Dec. 12, 2017

(51) Int. Cl.
| | | |
|---|---|---|
| *B64C 11/26* | (2006.01) | |
| *B64C 11/02* | (2006.01) | |
| *B64C 29/00* | (2006.01) | |
| *B32B 3/28* | (2006.01) | |
| *B32B 27/08* | (2006.01) | |

(52) U.S. Cl.
CPC ............... *B64C 11/26* (2013.01); *B32B 3/28* (2013.01); *B32B 27/08* (2013.01); *B64C 11/02* (2013.01); *B64C 29/0025* (2013.01); *B32B 2250/03* (2013.01); *B32B 2250/40* (2013.01); *B32B 2262/106* (2013.01); *B32B 2603/00* (2013.01)

(58) Field of Classification Search
CPC ......... B64C 11/26; B64C 11/24; B64C 11/02; B64C 11/10; B64C 11/20; B64C 29/0025; B64C 3/20; B64C 3/24; B32B 3/28; B32B 27/02; B32B 27/04; B32B 27/08; B32B 27/40; B32B 2250/00; B32B 2250/01; B32B 2250/02; B32B 2250/03; B32B 2250/04; B32B 2250/05; B32B 2250/40; B32B 2262/106; B32B 2603/00; F01D 5/147; F01D 5/282
USPC ....................................................... 416/229
See application file for complete search history.

(56) References Cited

U.S. PATENT DOCUMENTS

| | | | |
|---|---|---|---|
| 6,979,180 B2 * | 12/2005 | Motherwell | F01D 5/147 416/229 R |
| 8,800,924 B2 * | 8/2014 | Groves | B64C 3/22 244/123.1 |

* cited by examiner

*Primary Examiner* — Logan Kraft
*Assistant Examiner* — Justin A Pruitt
(74) *Attorney, Agent, or Firm* — Van Pelt, Yi & James LLP

(57) ABSTRACT

A corrugated lift fan rotor is disclosed. In various embodiments, a rotor includes an upper skin, a lower skin, and an at least partly corrugated core encased between the upper skin and the lower skin. In some embodiments, the core comprises a composite material, such as carbon fiber reinforced polymer composite material, and includes an upper cap portion, a lower cap portion, and a web portion extending between the upper and lower cap portions.

10 Claims, 6 Drawing Sheets

CORRUGATED LIFT FAN ROTOR

BACKGROUND OF THE INVENTION

Electric vertical (or short) takeoff and landing (VTOL) aircraft use lift fans (rotors) driven by electric motors to provide lift for vertical flight, such as takeoff, hover, and landing. The same or other rotors may be used to propel the aircraft in forward flight.

Electric aircraft typically operate in outdoor environments. Particularly when operating near the ground, as in during takeoff and landing, debris may strike the operating surfaces of the aircraft, including the lift fans and/or other rotors. In flight, birds and other airborne obstacles may strike the lift fans or other rotors.

In addition to needing to be able to withstand contact with foreign objects, lift fans and other rotors must be able to withstand the forces associated with flight, such as wind, rain, and applying the forces and moments required to control aircraft position and flight.

Electric aircraft lift fans and propellers are powered by onboard batteries. The weight of the aircraft is a significant factor in determining the operating range and other performance parameters of the aircraft. Composite materials may be used to provide a lightweight aircraft, including lightweight lift fan or other rotors, but such materials may be less able than more durable but heavier materials to withstand contact with foreign objects and other stresses of flight.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Corrugated rotors are disclosed. In various embodiments, a corrugated rotor as disclosed herein includes a corrugated core encased between an upper rotor skin and a lower rotor skin. The rotor may be used, in some embodiments, to provide a durable but relatively lightweight rotor for aviation applications, such as a lift fan rotor for a vertical (or short) takeoff and landing (VTOL) electric aircraft. In various embodiments, a corrugated rotor as disclosed herein includes a composite corrugated core, a composite upper skin, and a composite lower skin. In some embodiments, the composite corrugated core, a composite upper skin, and a composite lower skin are formed separately and bonded together to form a corrugated rotor.

In various embodiments, the outer skin of a corrugated rotor as disclosed herein comprises a rigid exterior shell, akin to an exoskeleton, and includes a corrugated core that is akin to an endoskeleton. In various embodiments, the corrugated core reinforces the outer shell without adding excessive weight to the rotor.

Figure 1A:
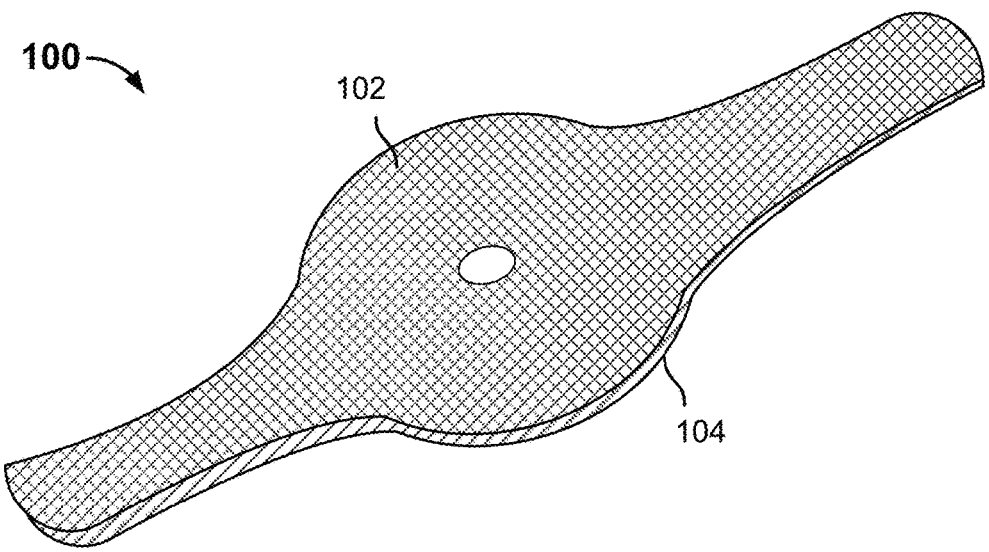
FIG. 1A is a diagram illustrating an embodiment of a corrugated lift fan rotor.

FIG. 1A is a diagram illustrating an embodiment of a corrugated lift fan rotor. In the example shown, lift fan rotor 100 includes an upper skin 102 and a lower skin 104. In various embodiments, a corrugated core, not shown in FIG. 1A, is encased in upper skin 102 and lower skin 104.

In some embodiments, upper skin 102 and lower skin 104 are composite structures, including but not limited to carbon fiber reinforced polymer materials. To fabricate each, layers of prepreg composite precursor fabric are layed up in a mold defining at least in part the shape of the upper skin 102 or lower skin 104, as applicable. The laid up prepreg stack is cured, e.g., heat cured under vacuum or other pressure conditions, to form a rigid composite part. In various embodiments, upper skin 102 may comprise an at least partially concave down shape, in the orientation a shown, while lower skin 104 defines a concave up shape. The corrugated core described above, not shown in FIG. 1A, in various embodiments at least partly fills a void that would otherwise be defined by bonding the upper skin 102 to the lower skin 104, as shown.

In various embodiments, the corrugated core extends radially from the bore hole defined in the middle of lift fan rotor 100, to admit a shaft to drive (rotate) the lift fan rotor, and extends longitudinally along at least a part of the respective cores of the left and right rotor blades, as shown.

While a two-bladed rotor is shown in FIG. 1A, in various embodiments corrugated-core rotors comprising more (e.g., four or more) or fewer (e.g., zero or one) blades are provided. In various embodiments, the central disk or hub portion of a corrugated rotor as disclosed herein may be larger or smaller than in the example shown in FIG. 1A. Rotors having corrugated cores in one or both of the rotor disk or hub and the rotor blades are contemplated.

Figure 1B:
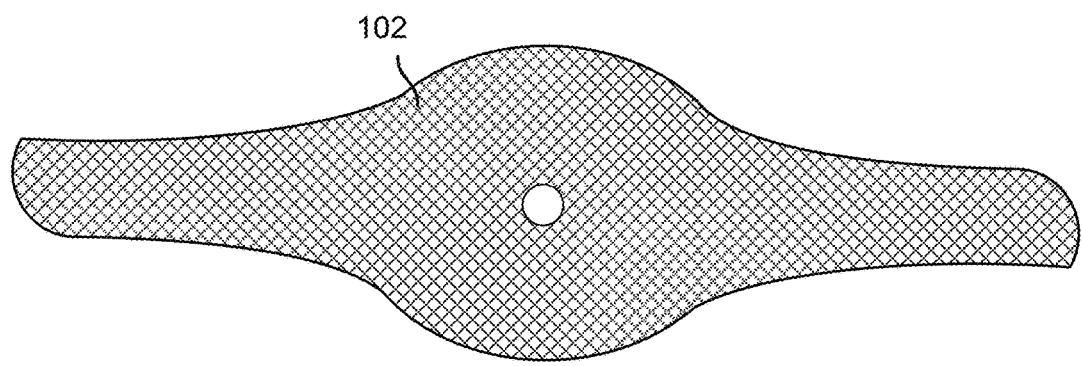
FIG. 1B is a diagram illustrating an embodiment of a corrugated lift fan rotor. Specifically, a top view of the corrugated lift fan rotor 100 of FIG. 1A is shown.

FIG. 1B is a diagram illustrating an embodiment of a corrugated lift fan rotor. Specifically, a top view of the corrugated lift fan rotor 100 of FIG. 1A is shown.

Figure 1C:
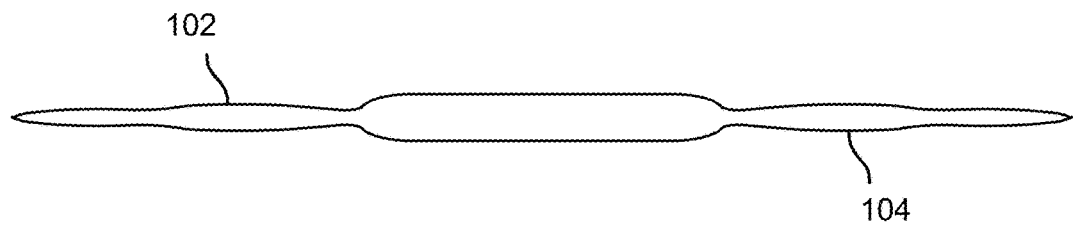
FIG. 1C is a diagram illustrating an embodiment of a corrugated lift fan rotor. Specifically, a front view of the corrugated lift fan rotor 100 of FIG. 1A is shown.

FIG. 1C is a diagram illustrating an embodiment of a corrugated lift fan rotor. Specifically, a front view of the corrugated lift fan rotor 100 of FIG. 1A is shown.

Figure 2A:
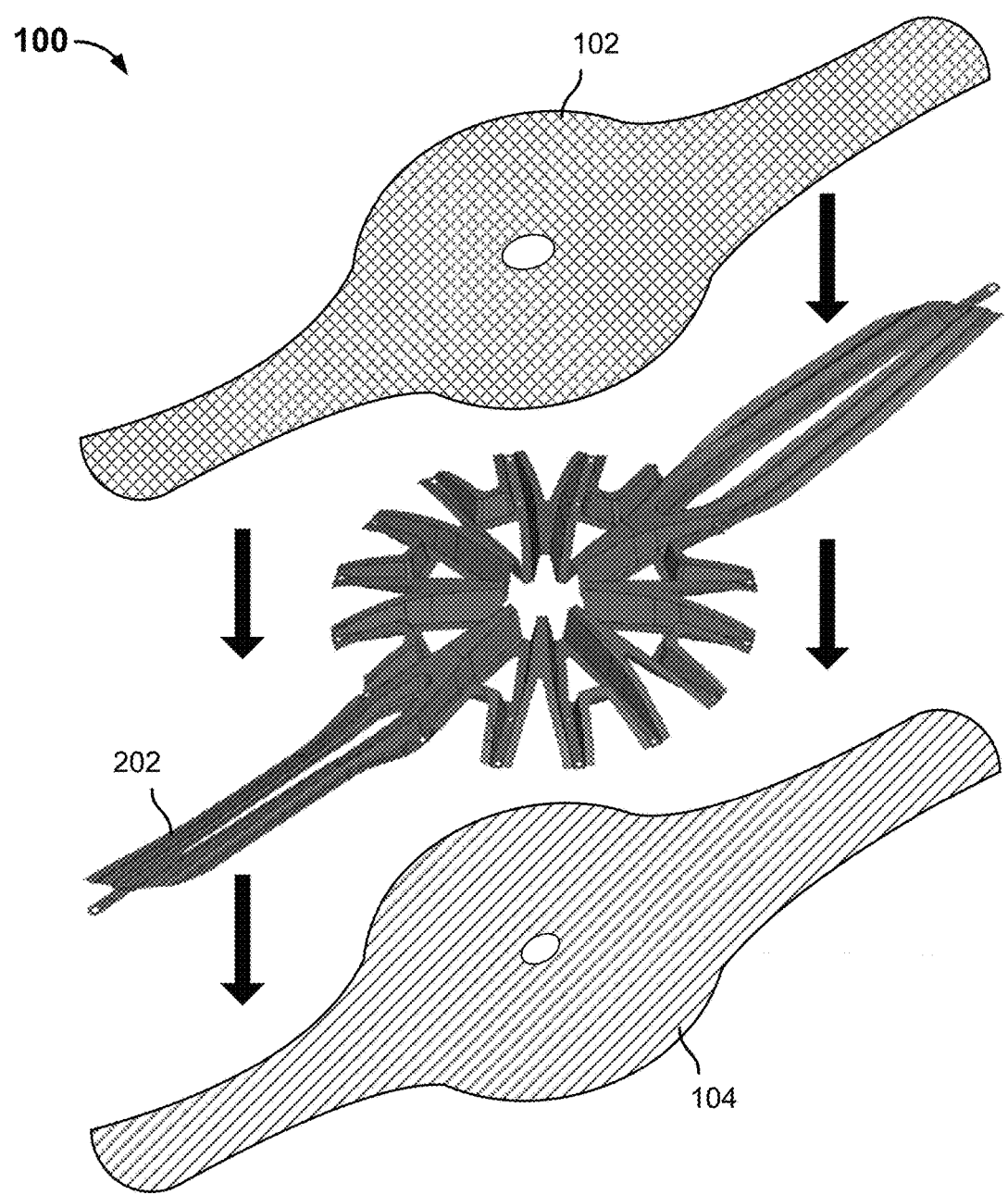
FIG. 2A is a diagram illustrating an embodiment of a corrugated lift fan rotor.

FIG. 2A is a diagram illustrating an embodiment of a corrugated lift fan rotor. In the example shown, corrugated lift fan rotor 100 of FIG. 1A is shown to include a corrugated core 202 in addition to upper skin 102 and lower skin 104.

As indicated by the downward pointing arrows, in various embodiments, corrugated core 202 is encased between upper skin 102 and lower skin 104. Corrugated core 202 is shown in FIG. 2A to be a unitary piece, but in some embodiments the corrugated core may be made up of two or more pieces.

In some embodiments, corrugated core 202 is a composite structure. Corrugated core 202 is formed in some such embodiments but laying up overlapping strips (or other pieces) of prepreg composite precursor fabric in a mold that at least partly defines the three-dimensional shape of corrugated core 202. The mold includes a plurality of relief features. Prepreg fabric is laid up in the mold, including by draping and layering overlapping pieces of prepreg over the relief features and in the valleys that lie between the relief features, to create a stack of prepreg layers that include portions overlying the relief features to define upper cap portions of the finished composite corrugated core part; portions laid in the lowermost regions of valleys between the relief feature to define lower cap portions of the finished composite corrugated core part; portions between the upper cap and lower cap portions to define web regions of the finished composite corrugated core part. The prepreg layers stacked in the mold are cured, e.g., by heat under vacuum or other pressure, to provide a rigid finished composite corrugated core part.

In various embodiments, a composite corrugated core part fabricated as described above, e.g., corrugated core 202 of FIG. 2A, is bonded (e.g., using paste or other adhesive) to one or both of the upper skin 102 and the lower skin 104 to provide a lift fan 100 with a corrugated core as disclosed herein. For example, in various embodiments, adhesive is applied to the upper cap and lower cap parts of the corrugated core 202, and optionally to one or both of the upper skin 102 and lower skin 104, in a pattern corresponding to the upper or lower cap portions of the corrugated core 202, respectively, and the pieces are assembled as indicated by the downward arrows in FIG. 2A to provide a finished corrugated lift fan rotor 100.

In various embodiments, a substantially cylindrical bearing bore (not shown) is inserted into one or more of the upper skin, the corrugated core, and the lower skin. The bearing bore may be configured to receive a motor shaft to drive (rotate) the rotor.

While the example shown in FIG. 2A includes a corrugated core 202 encased between an exterior skin comprising separate upper and lower skin parts 102, 104, in some alternative embodiments a corrugated core as disclosed herein may be enclosed within an outer rotor skin comprising more or fewer pieces.

Figure 2B:
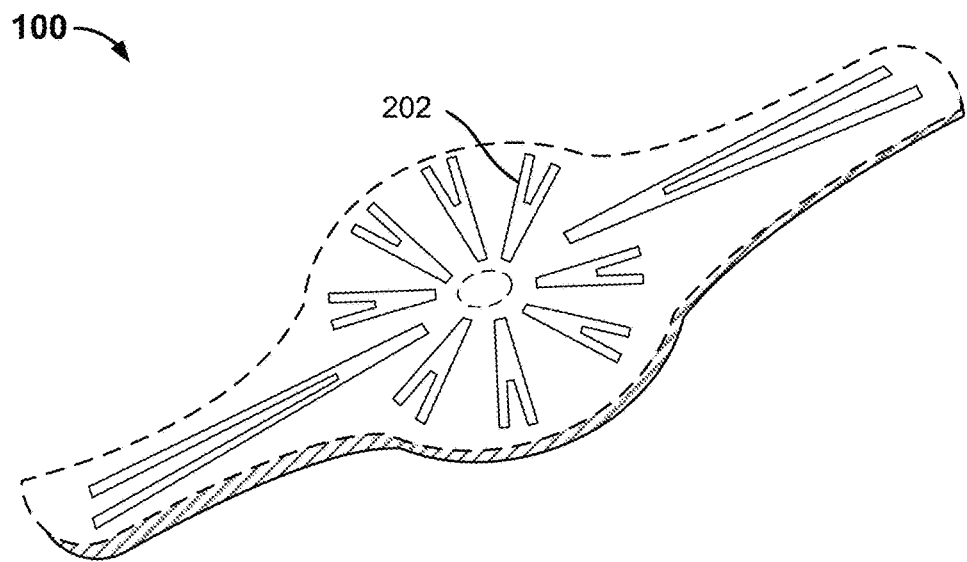
FIG. 2B is a diagram illustrating an embodiment of a corrugated lift fan rotor.

FIG. 2B is a diagram illustrating an embodiment of a corrugated lift fan rotor. In the example shown, the corrugated core 202 of FIG. 2A is shown in conceptual horizontal cross-section. In various embodiments, a corrugated rotor core as disclosed herein, such as corrugated core 202, includes upper cap portions bonded to an inner surface of the upper skin 102, lower cap portions bonded to an inner surface of the lower skin 104, and web portions extending between the upper cap and lower cap portions. As shown in FIG. 2B, a horizontal cross-section of a corrugated rotor core as disclosed herein includes regions where web portions of the corrugate core are present and voids between them. In various embodiments, increased strength and rigidity are provided by the corrugated core where material comprising the core is present, while leaving voids such as those shown in FIG. 2B enables a relatively lightweight rotor to be provided.

Figure 2C:
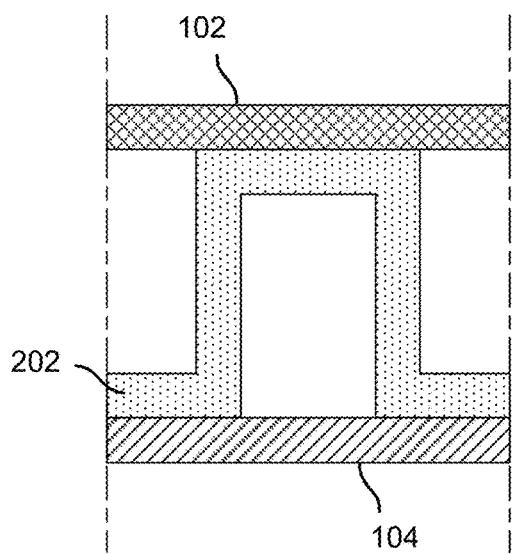
FIG. 2C is a diagram illustrating an embodiment of a corrugated lift fan rotor.

FIG. 2C is a diagram illustrating an embodiment of a corrugated lift fan rotor. In the example shown, a portion of corrugated core 202 is shown in vertical cross-section. As shown, the illustrated portion of corrugated core 202 includes upper cap portions bonded to the inner surface of upper skin 102, lower cap portions bonded to the inner surface of lower skin 104, and web portions running (vertically in this example) between the upper and lower cap portions.

While an "omega" cross-section is shown in FIG. 2C, in various embodiments and corrugation cross-sectional shape or pattern may be used, including without limitation an "I", an "M", or any other cross-section or combination thereof by which a corrugated core may span between the respective inner surfaces of an upper and lower rotor skin without filling completely the interior space between the upper and lower skin.

Figure 2D:
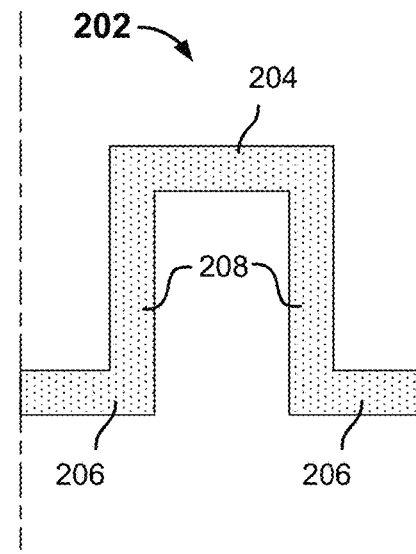
FIG. 2D is a diagram illustrating an embodiment of a corrugated lift fan rotor.

FIG. 2D is a diagram illustrating an embodiment of a corrugated lift fan rotor. Specifically, the portion of corrugated core 202 shown in FIG. 2C is shown without the upper and lower skins 102, 104 being shown, to enable parts of the cross-section to be labeled. As shown, the illustrated portion of corrugate core 202 includes an upper cap portion 204, lower cap portions 206, and web portions 208.

While composite materials are described herein as being used in various embodiments to provide a corrugated rotor as disclosed herein, in various embodiments other materials may be used to provide one or more of the upper skin, corrugated core, and lower skin. For example, the upper and lower skin may comprise a lightweight metal such as aluminum or titanium. In some embodiments, the corrugated core may be formed from sheet metal and/or by bending or otherwise shaping material that is corrugated, such as honeycombed or otherwise corrugated aluminum or other lightweight metal. In various embodiments, a corrugated core as disclosed herein may be fabricated by extrusion, molding, casting, machining, milling, bending, stamping, or any process and/or combination thereof that defines a corrugation structure as disclosed herein.

Figure 3A:
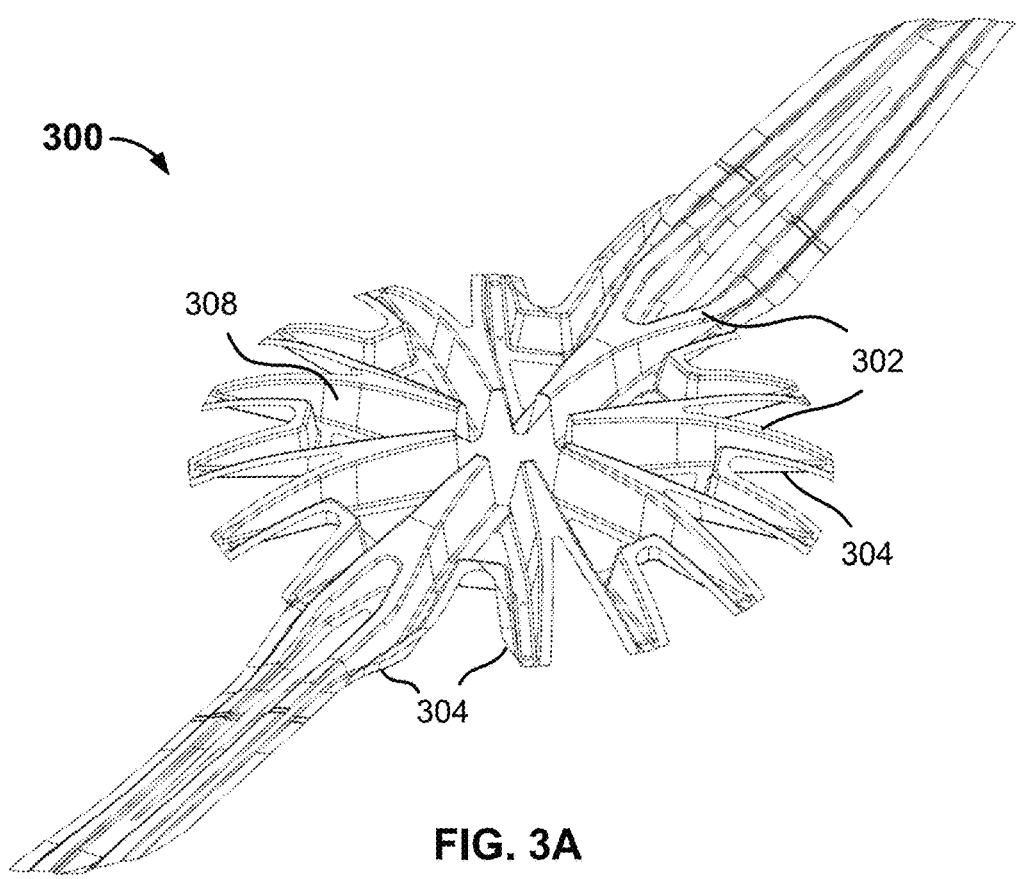
FIG. 3A is a diagram illustrating an embodiment of a corrugated lift fan rotor core.

FIG. 3A is a diagram illustrating an embodiment of a corrugated lift fan rotor core. In the example shown, corrugated core 300 includes a central rosette portion associated with a central disk of the lift fan rotor and left/right blade portions. Each of the respective portions include upper cap portions 302 that interface with (e.g., contact and may be bonded to) the inner surface of the upper skin (not shown in FIG. 3A), lower cap portions 304, and web portions 308 extending between adjacent upper cap portions 302 and lower cap portions 304.

As the example in FIG. 3A shows, in various embodiments, a corrugated rotor core as disclosed herein may have any arbitrary shape. For example, the upper and lower cap portions 302, 304 may have any shape and curvature, e.g., as required to conform to a corresponding shape of an inner surface of a rotor skin to which the corrugated core may be designed to conform. In addition, the height of web portions 308 may vary as needed to conform to the height of the space between the respective inner surfaces of the upper and lower skins.

In some embodiments, in assembling a lift fan comprising the corrugated core 300 of FIG. 3A, a bearing bore having tapered teeth on the outer cylinder surface of the bearing bore is inserted in the center of the central rosette portion of corrugated core 300. The tapered teeth engage with and may be bonded to corresponding tapered corrugation structures of the corrugated core 300, specifically the tapered "hat" shaped inner ends of the portions of corrugated core 300 that defined the inner hole of the corrugated core 300, to provide strength and rigidity and strong mechanical coupling to the core 300.

Figure 3B:
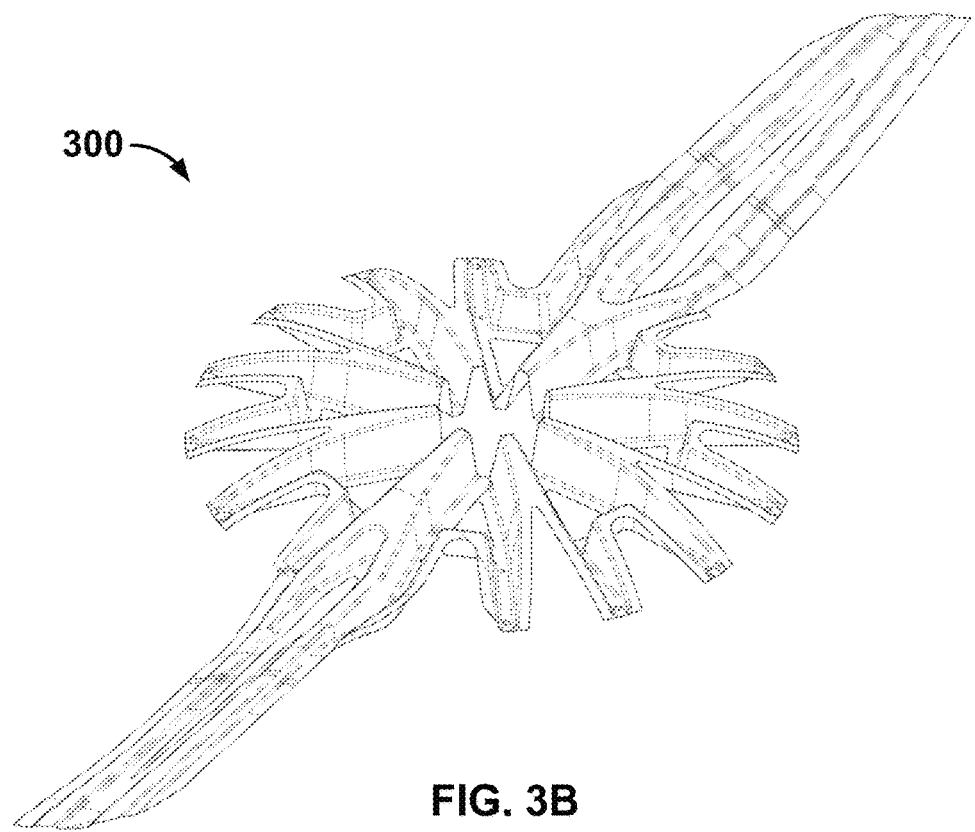
FIG. 3B is a diagram illustrating an embodiment of a corrugated lift fan rotor core.

FIG. 3B is a diagram illustrating an embodiment of a corrugated lift fan rotor core. Specifically, the corrugated core 300 of FIG. 3A is shown with dashed tangent lines (instead of solid tangent lines as shown in FIG. 3A), to further illustrate and highlight features of the corrugated core 300.

Figure 3C:
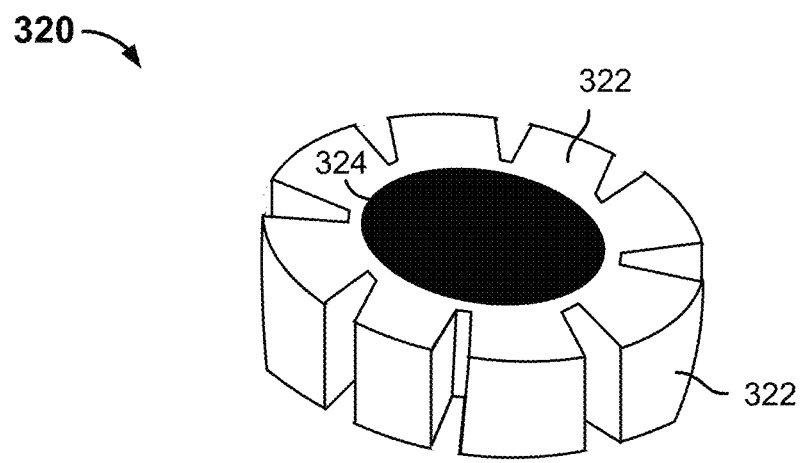
FIG. 3C is a diagram illustrating an embodiment of a bearing bore.

FIG. 3C is a diagram illustrating an embodiment of a bearing bore. In the example shown, bearing bore 322 includes a plurality of teeth 322 that extend radially from a central bore 324. In various embodiments, the teeth 322 are of a size and shape that complements openings in a rosette portion of an associated corrugated lift fan rotor core, such as core 300 of FIGS. 3A and 3B.

Figure 3D:
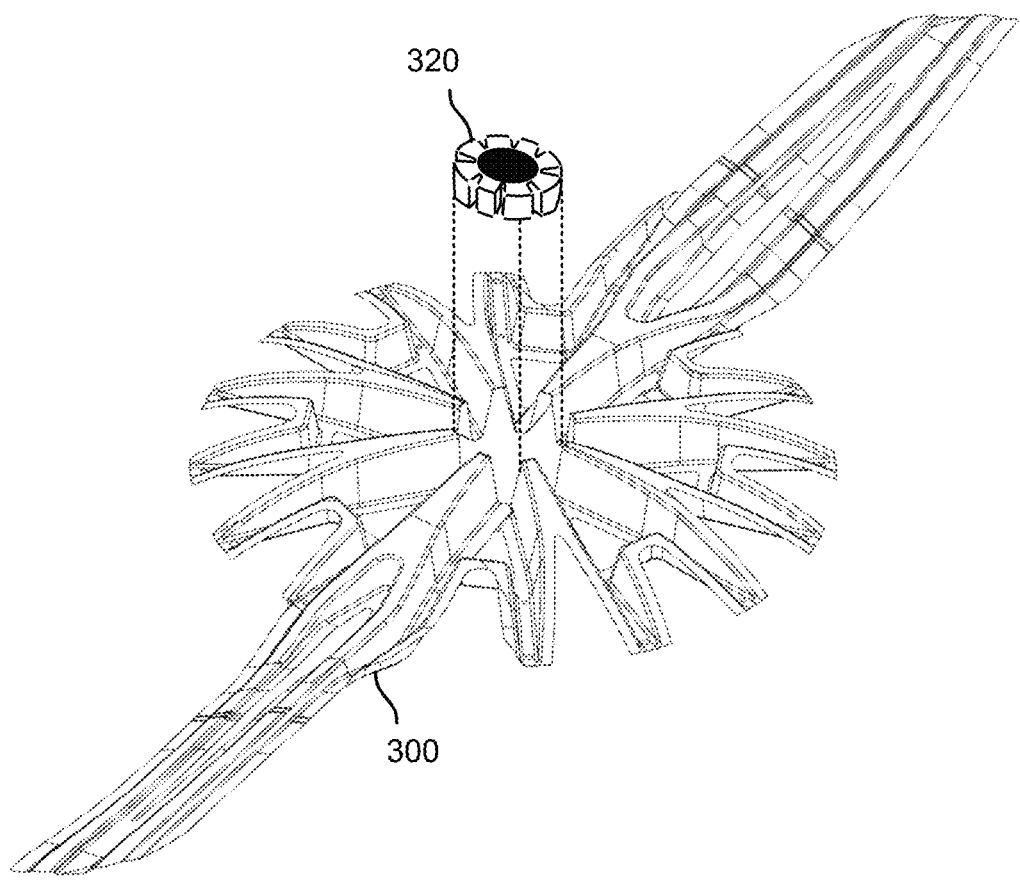
FIG. 3D is a diagram illustrating an embodiment of a bearing bore and a corrugated lift fan rotor core.

FIG. 3D is a diagram illustrating an embodiment of a bearing bore and a corrugated lift fan rotor core. In the example shown, vertical dotted lines show how the bearing bore 322 mates to the corrugated lift fan rotor core 300 of FIGS. 3A and 3B.

Figure 4:
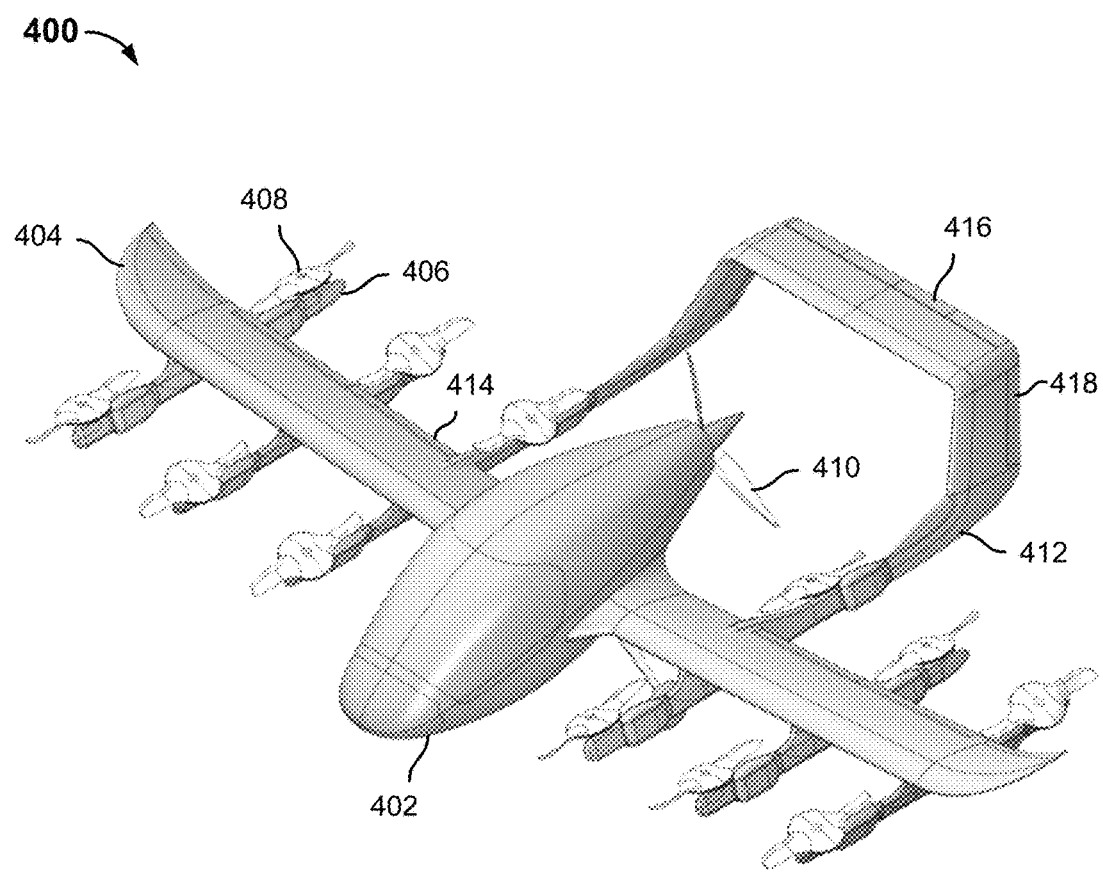
FIG. 4 is a diagram illustrating an embodiment of an electric aircraft comprising a plurality of corrugated lift fan rotors.

FIG. 4 is a diagram illustrating an embodiment of an electric aircraft comprising a plurality of corrugated lift fan rotors. In the example shown, aircraft 400 includes a fuselage 402 and wings 404. Three underwing mounting booms 406 are mounted under each wing 404, and on the forward and aft end of each mounting boom a lift fan 408 and associated motor (not shown) is mounted. A pusher type propeller 410 provides thrust for forward flight. Aircraft 400 includes tail structures 412 extending aft from the inboard booms 406. Flight control surfaces 414, 416, and 418 provide stability and control during forward flight.

In various embodiments, one or more of the lift fans 408 and the propeller 410 comprises a corrugated rotor as disclosed herein. For example, in various embodiments, lift fans 408 comprise a corrugated lift fan rotor as illustrated in one or more of FIGS. 1A through 3B.

Using techniques disclosed herein, a rotor that is durable and lightweight may be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotor, comprising:
   an upper skin;
   a lower skin; and
   an at least partly corrugated core encased between the upper skin and the lower skin;
   wherein the core includes a first portion associated with a central disk portion of the rotor and a second portion associated with one or more rotor blade portions of the rotor.

2. The rotor of claim 1, wherein the core comprises a composite material.

3. The rotor of claim 2, wherein the core comprises carbon fiber reinforced polymer material.

4. The rotor of claim 1, wherein the core comprises an upper cap portion associated with the upper skin.

5. The rotor of claim 4, wherein the upper cap portions conforms to a shape of at least a part of the upper skin.

6. The rotor of claim 4, wherein the core further comprises a lower cap portion associated with the lower skin.

7. The rotor of claim 6, wherein the core further comprises a web portion that spans between and mechanically couples the upper cap portion and the lower cap portion.

8. The rotor of claim 1, wherein the core fills less than all of an interior space defined and enclosed by the upper skin and the lower skin.

9. The rotor of claim 1, wherein the first portions comprises a rosette comprising a plurality of corrugated structures that extend radially from a central bore hole of the rotor.

10. The rotor of claim 9, further comprising a bearing bore having an outer cylindrical surface comprising a plurality of teeth configured to receive corresponding inner ends of said first portions comprising the rosette.

\* \* \* \* \*